United States Patent
Hikmet et al.

(10) Patent No.: US 11,378,250 B2
(45) Date of Patent: Jul. 5, 2022

(54) DECORATIVE LIGHT SOURCE SHIELDING (71) Applicant: SIGNIFY HOLDING B.V., Eindhoven (NL)

(72) Inventors: Rifat Ata Mustafa Hikmet, Eindhoven (NL); Paulus Albertus Van Hal, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 93 days.

(21) Appl. No.: 17/046,123

(22) PCT Filed: Apr. 5, 2019

(86) PCT No.: PCT/EP2019/058659
§ 371 (c)(1),
(2) Date: Oct. 8, 2020

(87) PCT Pub. No.: WO2019/197289
PCT Pub. Date: Oct. 17, 2019

(65) Prior Publication Data
US 2021/0033258 A1    Feb. 4, 2021

(30) Foreign Application Priority Data

Apr. 10, 2018    (EP) .................... 18166431

(51) Int. Cl.
*F21V 1/22*    (2006.01)
*B33Y 10/00*    (2015.01)
(Continued)

(52) U.S. Cl.
CPC .............. *F21V 1/22* (2013.01); *B29C 64/118* (2017.08); *B33Y 10/00* (2014.12); *B33Y 80/00* (2014.12);
(Continued)

(58) Field of Classification Search
CPC . F21V 1/26; F21V 1/22; B29C 64/118; B33Y 80/00; B33Y 10/00
See application file for complete search history.

(56) References Cited

U.S. PATENT DOCUMENTS 3,596,085 A    7/1971  Hansen
2014/0247579 A1*  9/2014  Hikmet ............... F21V 9/08
                                                      362/84
(Continued)

FOREIGN PATENT DOCUMENTS

CA    2809943 A1    9/2014
DE    2221481 A1    11/1973
(Continued)

*Primary Examiner* — Anne M Hines
(74) *Attorney, Agent, or Firm* — Daniel J. Piotrowski (57) ABSTRACT

A body (10) is disclosed for obscuring a light source arrangement (3). The body comprises a surface (20) including a plurality of optically reflective relief structures (30, 30', 30"), each relief structure comprising a first portion (31) and a second portion (33) adjacent to said first portion extending from said surface, wherein the first portion has a different optical reflectivity to the second portion and neighboring optically reflective relief structures are separated by an optically transparent medium contacting said neighboring optically reflective relief structures. Also disclosed is a luminaire comprising such a body and a method of manufacturing such a body.

13 Claims, 10 Drawing Sheets

(51) Int. Cl.
- *B33Y 80/00* (2015.01)
- *B29C 64/118* (2017.01)
- *F21V 1/26* (2006.01)
- *B29L 31/00* (2006.01)

(52) U.S. Cl.
CPC ......... *F21V 1/26* (2013.01); *B29L 2031/7472* (2013.01)

(56) References Cited

U.S. PATENT DOCUMENTS

| | | | |
|---|---|---|---|
| 2014/0312606 A1* | 10/2014 | Lister | G03F 7/20 430/320 |
| 2016/0346996 A1 | 12/2016 | Hakkaku et al. | |
| 2017/0138047 A1 | 5/2017 | Kalkanoglu et al. | |
| 2017/0165919 A1 | 6/2017 | Ohi et al. | |

FOREIGN PATENT DOCUMENTS

| | | |
|---|---|---|
| DE | 29906787 U1 | 9/2000 |
| EP | 2955431 A1 | 12/2015 |
| KR | 20090066536 A | 6/2009 |
| WO | 2014167480 A1 | 10/2014 |
| WO | 2017080842 A1 | 5/2017 |

\* cited by examiner

DECORATIVE LIGHT SOURCE SHIELDING

CROSS-REFERENCE TO PRIOR APPLICATIONS

This application is the U.S. National Phase application under 35 U.S.C. § 371 of International Application No. PCT/2019/058659, filed on Apr. 5, 2019, which claims the benefit of European Patent Application No. 18166431.9, filed on Apr. 10, 2018. These applications are hereby incorporated by reference herein.

FIELD OF THE INVENTION

The present invention relates to a body for obscuring a light source arrangement.

The present invention further relates to a luminaire comprising such a body and light source arrangement.

The present invention still further relates to a method of manufacturing such a body.

BACKGROUND OF THE INVENTION

It is desirable to hide light sources such as incandescent light sources, fluorescent light sources, halogen light sources, solid state light sources (e.g. LEDs) and so on from direct view. This may be to improve the aesthetic appearance of the light source as well as to avoid glare when looking directly at such a light source, which can be unpleasant and can even cause headaches or similar medical issues.

To this end, the light sources are typically hidden from direct view by an optically reflective body that alters the luminous distribution of the light source, for example by diffusing such a luminous distribution or altering the intensity and/or spectral composition of such a luminous distribution. Such bodies may be closed bodies, e.g. lamp shades or the like, which for instance may be used in combination with pendant light sources of free-standing light sources such as floor lamps or table lamps, or may be open bodies, e.g. panels or the like, which for instance may be used in combination with surface-mounted light sources such as wall-mounted lighting.

It is known that the angular dependence of the appearance of such a body may be controlled. For example, US2017/0165919 A1 discloses a three-dimensional object including a shaping base having first and second outer surfaces adjacent to each other at an adjacent angle, a first coloured layer formed on the first outer surface and including a transparent material coloured in a first colour and a second coloured layer formed on the second outer surface and including a transparent material coloured in a second colour different from the first colour. A partition layer is interposed between the side surfaces of the first coloured layer and the second coloured layer that is opaque and has one of the first colour, the second colour and an achromatic colour. Such a three-dimensional object maintains a visual colour quality when observed at different positions or from different angles. However, it may be desirable to introduce angular variability in the appearance of such a body, for example to add interest to its appearance.

SUMMARY OF THE INVENTION

The present invention seeks to provide a body for obscuring a light source arrangement that has an appearance that depends on an angle under which the body is viewed.

The present invention further seeks to provide a luminaire including such a body and light source arrangement.

The present invention yet further seeks to provide a method of manufacturing such a body.

According to an aspect, there is provided a body for obscuring a light source arrangement, the body comprising a surface including a plurality of optically reflective relief structures, each relief structure comprising a first portion and a second portion adjacent to said first portion extending from said surface separated by a transparent region, wherein the first portion has a different optical reflectivity to the second portion and neighboring optically reflective relief structures are separated by an optically transparent medium contacting said neighboring optically reflective relief structures. Consequently, depending on the viewing angle of the body, the appearance of the body will be dominated by the respective first portions or the respective second portions of the optically reflective relief structures, which due to the fact that these respective optically reflective relief structures have different optical reflectivity, will give the body an appearance that is a function of a viewing angle or range of viewing angles, thereby providing a body having an interesting appearance. The optically transparent medium may be an optically transparent polymer or air, for instance.

Preferably, the first portion and the second portion have different colours such that the body will have a coloured appearance that changes with changing viewing angles. This for example may be achieved by forming the first and second portions using different coloured materials. Black materials, metallic colours, reflective particles, different levels of reflectivity can be used in the application in order to control the optical reflectivity of the respective portion of the body.

In the context of the present invention, it should be understood that optical reflectivity refers to an ability of a material to reflect light having a particular property, such as a particular spectral composition. This is intended to include minimal reflectivity of e.g. black materials, as will be understood from the teachings of the present application. In addition, a difference in optical reflectivity may also refer to a different degree of reflectivity such that light is reflected in different intensities. It is furthermore intended to refer to an angular redistribution of incident light such where reference is made to differences in optical reflectivity, this may refer to differences in reflected light distributions as well as to light reflected in different directions.

The body may be regularly shaped, e.g. may comprise a regular pattern of optically reflective relief structures extending from its surface, in which the first portions and the second portions of all optically reflective relief structures face the same way in order to achieve the desired angularly dependent appearance of the body. However, certain variations between optically reflective relief structures may be contemplated. For example, at least some of the optically reflective relief structures have different heights to the other optically reflective relief structures of said plurality. Not only may this add interest to the appearance of the body, but is also creates local variations in the viewing angle at which the appearance of the body transitions between different appearances, e.g. different colours, thereby adding complexity to the angular dependent appearance of the body.

In an embodiment, each optically reflective relief structure has a height to width ratio of at most 10 in order to enable light penetration into the optically reflective relief structures.

The optically reflective relief structures extending from the surface of the body may be abutting at the base of the relief structures proximal to the surface. In such embodiments, the optically reflective relief structures typically are less wide at their distal ends, e.g. have a tapered shape, a triangular shape, a conical shape and so on, in order to obtain the spatial separation between adjacent optically reflective relief structures that facilitates the aforementioned angular dependency in the appearance of the body. Alternatively, the surface comprises an optically reflective intermediate surface portion in between a first optically reflective relief structure and a second optically reflective relief structure, the first portion of the first optically reflective relief structure facing the second portion of the second optically reflective relief structure. Such an intermediate surface portion may comprise a first region proximal to the first portion of the first optically reflective relief structure, the first region having the same optical reflectivity as said first portion; and a second region adjacent to said first region and proximal to the second portion of the second optically reflective relief structure, the second region having the same optical reflectivity as said second portion. This ensures that under a wide range of viewing angles a homogenous appearance of the body is obtained, as under viewing angles at which a particular portion of an optically reflective relief structure is observed together with a region of an adjacent intermediate surface portion, this region has the same appearance as its abutting optically reflective relief structure portion. At very large viewing angles, e.g. close to perpendicular viewing angles relative to the body surface region being viewed, both regions of the an optically reflective intermediate surface portion may become visible, which can cause interference in the appearance of the body, e.g. colour mixing of the respective colours of the first and second regions of the an optically reflective intermediate surface portion. To this end, the width of the optically reflective intermediate surface portion preferably is minimized relative to the height of the first and second optically reflective relief structures. However in order to be able to see inside such a high aspect ratio relief structure the ratio between this height and the width of the optically reflective intermediate surface portion is preferably at most 10.

The first region and the second region of the optically reflective intermediate surface portion may have different widths such that there is asymmetry between respective ranges of viewing angles under which the different appearances of the body are visible in order to add interest to the appearance of the body. Similarly, the intermediate surface portion may have a colour different to the first and second portions of said first and second relief structures such that under certain viewing angles a third appearance of the body is created in order to add interest to its appearance.

As previously mentioned, the body may carry a regular pattern of optically reflective relief structures. For example, the body may comprise a plurality of repeating units, each defined by a relief structure and an adjacent intermediate surface portion. In a preferred embodiment, such a repeating unit has a width preferably in a range of 0.1-5 mm and more preferably in a range of 0.1-1 mm in order to give the body a more uniform coloured appearance.

The body may be provides with a singular regular pattern of optically reflective relief structures having the same first and second portions, such that the body has two main appearances, i.e. as governed by the optical reflectivity of the first and second portions respectively. Alternatively, the body surface comprises a first periodic region comprising a first plurality of said repeating units and a second periodic region comprising a second plurality of said repeating units, wherein the repeating units in said first plurality have a different optical reflectivity to the repeating units in said second plurality. Consequently, the body is provided with different periodic regions in which for each periodic region two different angularly dependent appearances are provided, with these appearances differing between different periodic regions in order to provide the body with a more complex (i.e. non-uniform or region-dependent) appearance for a given viewing angle.

The body may have any suitable shape. For example, the body may define a planar or curved surface behind which the light source arrangement may be positioned, which for example may be advantageous where the light source arrangement is to be mounted on a surface such as a wall or ceiling. Alternatively, the surface may be a closed surface enveloping a space for housing the light source arrangement, i.e. the body may be a closed body within which the light source arrangement is to be positioned, e.g. in case of the body forming a lamp shade or the like.

According to another aspect, there is provided a luminaire comprising the body of any of the herein described embodiments and a light source arrangement positioned relative to the body. Such a luminaire benefits from having an appearance that is dependent of its viewing angle (or mounting orientation of the body), thereby providing an aesthetically interesting luminaire. Any suitable light source or light sources may be used in such a luminaire such as incandescent light sources, fluorescent light sources, halogen light sources, solid state light sources such as LEDs, and so on, or any combination of such light sources.

According to yet another aspect, there is provided a method of manufacturing a body for obscuring a light source arrangement, the body comprising a surface including a plurality of optically reflective relief structures, each relief structure comprising a first portion and a second portion adjacent to said first portion extending from said surface, wherein the first portion has a different optical reflectivity to the second portion, the method comprising simultaneously printing each first portion and second portion using 3-D printing. With 3-D printing, the body may be manufactured in a straightforward manner as the different materials used to form the different portions of the body may be readily combined. Preferably, the body is printed as a multi-layered structure using fused deposition modelling, which is particularly suitable to provide such a 3-D body in a straightforward manner.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

It should be understood that the Figures are merely schematic and are not drawn to scale. It should also be understood that the same reference numerals are used throughout the Figures to indicate the same or similar parts.

In the context of the present application, where reference is made to optical reflectivity, this refers to a degree of reflectivity or of material in respect of light of a certain spectral composition, such as visible light. Where reference is made to a difference in optical reflectivity, this may refer to a difference in reflectivity, and includes embodiments in which a difference in optical reflectivity between different portions of the body of the present invention means that one of the portions is optically highly reflective where the other of the portions is has a lower reflectivity. A different optical reflectivity further may refer to a different reflectivity of light having a certain spectral composition, such as a different reflectivity to different spectral components of such lights. This may manifest itself by materials having such a different optical reflectivity appearing to have different colours upon such light getting reflected by such materials, due to different spectral components of such lights being absorbed or reflected by such materials. However, differences in optical reflectivity are not necessarily limited to such different interactions with the various spectral components of the light, but are also intended to cover different degrees of absorbance, translucency, scattering and so on, in order to give optically reflective regions with different optical reflectivity a distinctive appearance.

Figure 1:
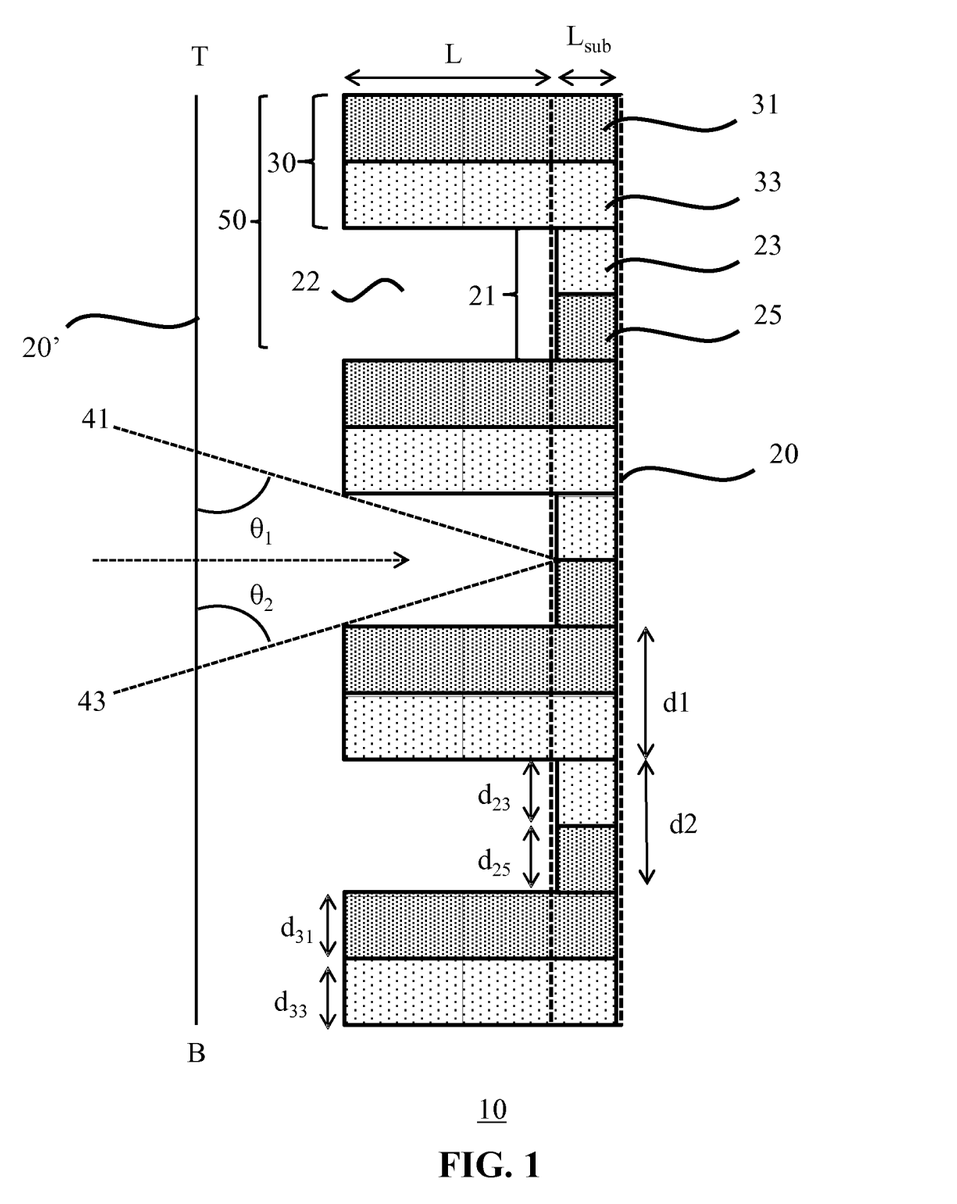
FIG. 1 schematically depicts a cross-sectional view of a body for obscuring a light source arrangement according to an embodiment.

FIG. 1 schematically depicts a cross-section of a body 10 having a surface 20 from which a plurality of relief structures 30 extend. Each relief structure 30 comprises a first portion 31 and a second portion 33 adjacent to the first portion 31 extending from the surface 20. The first portion 31 of the relief structure 30 typically has a different optical reflectivity to the second portion 33 of the relief structure 30 such that depending on the angle under which the body 10 is viewed by an observer, the body 10 will have a different appearance to this observer. For example, the first portion 31 of the relief structure 30 may have a first colour and the second portion 33 of the relief structure 30 may have a second colour different to the first colour such that depending on the angle under which the body 10 is viewed by the observer, the body 10 will appear to have a different colour. Alternatively, one of the first portion 31 and the second portion 33 may be black, In yet a further alternative embodiment, the degree of optical reflectivity between a first portion 31 and a second portion 33 of the relief structure 30 may differ such that depending on the viewing angle of the body 10 by the observer, the body 10 may have a different brightness.

The respective relief structures 30 are separated from each other by intermediate regions 22 of a transparent medium over the portions 21 of the surface 20. In FIG. 1, the transparent medium is air, but it is equally feasible to fill the intermediate regions 22 over the regions 21 of the surface 20 with an optically transparent polymer (not shown) such that at least part of neighboring optically reflective relief structures 30 are contacted by the optically transparent polymer. In such an arrangement, a second region 33 of the first relief structure 30 typically faces a first region 31 of a second (neighboring) relief structure 30 such that an observer looking at the body 10 under a particular angle can only see the first regions 31 or the second regions 33 of the relief structures 30, thereby giving the body 10 a uniform appearance in terms of optical reflectivity. To achieve such an effect, at least part of the relief structures 30 must be spatially separated from each other. In FIG. 1, this is achieved by the surface 20 comprising intermediate surface portions 21 in between neighboring relief structures 30. Each intermediate surface portion 21 comprises a first region 25 proximal to the first portion 31 of a first relief structure 30 of such neighboring relief structures, with the first region 25 having the same optical reflectivity as said first portion 31 and a second region 23 proximal to the second portion 33 of a second relief structure 30 of such neighboring relief structures, with the second region 23 having the same optical reflectivity as said second portion 33.

Consequently, when the observer looks at the body under at most an angle $\theta_2$, e.g. from below the body 10 with the body 10 in a vertical orientation as symbolized by the vertical viewing plane 20' having a top T and a bottom B, with angle $\theta_2$ being defined relative to this viewing plane, the second portions 33 of the relief structures 30 and the second regions 23 of the intermediate surface portions 20 of the body 10 are obscured from view such that the appearance of the body 10 to the observer will be defined by the first portions 31 of the relief structures 30 and the first regions 25 of the intermediate surface portions 20 of the body 10. On the other hand, when the observer looks at the body under at most an angle $\theta_1$, e.g. from above the body 10 with the body 10 in the aforementioned vertical orientation as symbolized by the vertical viewing plane 20' having a top T and a bottom B, with angle $\theta_1$ being defined relative to this viewing plane, the first portions 31 of the relief structures 30 and the first regions 25 of the intermediate surface portions 20 of the body 10 are obscured from view such that the appearance of the body 10 to the observer will be defined by the second portions 33 of the relief structures 30 and the second regions 23 of the intermediate surface portions 20 of the body 10.

As will be understood by the skilled person, where angle $\theta$ becomes large, i.e. lies in between $\theta_1$ and $\theta_2$, as indicated by the dashed arrow, the observer will be able to see both the second portion 33 of the first relief structure 30, the first portion 31 of its neighboring second relief structure 30 and both the first region 25 and the second region 23 of the intermediate surface portion 21 in between the neighboring relief structures 30, such that the appearance of the body 10 will be a blend of the respective optical reflectivities of these regions and portions, e.g. a blending of the different colours of these regions and portions as previously explained. This may be undesirable from an aesthetic perspective, such that the range of angles under which such blending of the different appearances of the body 10 in such a case should be minimized.

This for example may be achieved by maximising the ratio between the height L of the surface relief structures 30 (in which first portion 31 has a width $d_{31}$ and second portion 33 has a width $d_{33}$) and the width d2 of the intermediate surface regions 21 (in which portion 23 has a width $d_{23}$ and portion 25 has a width $d_{25}$). On the other hand, in order to be able to see the side surfaces of the relief structures 30 (enabling light to escape) the relief structures 30 should not be too deep. In an example embodiment, the ratio L/d2 is at most 10, but other suitable values of this ratio of course may be contemplated. Similarly, the overall width d1+d2 of the repeating unit 50 of the body 10 formed by a surface relief structure 30 having a width d1 and an adjacent intermediate surface portion 21 having a width d2 may be kept as small as possible for this reason. For example, the overall width of such a repeating unit 50 preferably may be in a range of 0.1-10 mm and more preferably in a range 0.1-5 mm and most preferably in a range 0.1-1 mm although other values for the overall width may be contemplated.

Where the first portions 31 and the second portions 33 of the surface relief structures 30 have different colours, it is furthermore desirable to keep the width d1 of the surface relief structure 30 as small as possible to improve the colour purity of the body 10. On the other hand, in order to be able to see the side surfaces of the relief structures 30 these structures should not be too deep. In an embodiment, a ratio h/d1 is selected to be smaller than 10. At the same time, in order to have a contrast between different colour portions of the body 10 at viewing angle $\theta_1$, the following ratios may be applied: $(d_1+d_2+2L)/d_1>3$, and/or $(d_{25}+d_{31}+L)/d_{33}>3$. It is furthermore noted that the height of the $L_{sub}$ of the surface 20 in some embodiments may be (approximately) zero.

The body 10 may have any suitable shape and may be made of any suitable material, as will be explained in further detail below. Regarding the shape of the body 10, the body 10 may be shaped as a panel having a planar, curved or freeform shape. In such embodiments, the body 10 may be used as a lampshade or the like to obscure a surface mounted light source arrangement including one or more light sources, such as a luminaire comprising one or more wall-mounted light sources. Alternatively, the body 10 may have a closed surface 20 that envelopes an internal volume of the body 10 in which such a light source arrangement may be positioned. For example, in such embodiments the body 10 may be used as a lampshade or the like for a pendant or freestanding luminaire such as a ceiling pendant, a floor lamp and so on.

Figure 2:
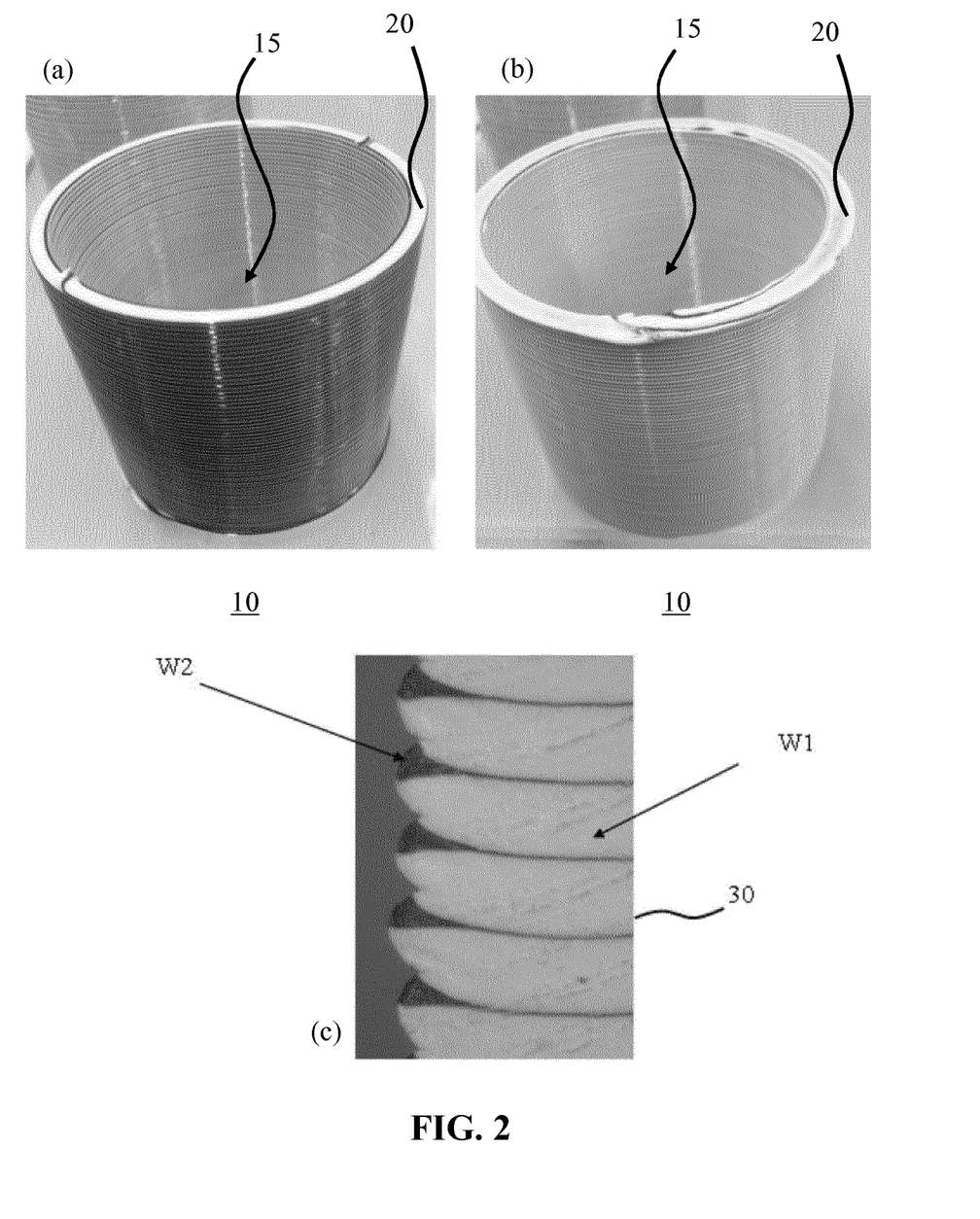
FIG. 2 depicts photographic images of a body for obscuring a light source arrangement according to an example embodiment.

FIG. 2 shows a pair of photographic images (a) and (b) of such a body 10 having a closed surface 20 enveloping an internal volume 15 in which a light source arrangement may be positioned. In the right image, the body 10 has been flipped over vertically (i.e. rotated by 180°) relative to the orientation of the body 10 in the left image, thereby providing a view of the body 10 under viewing angles $\theta_1$ and $\theta_2$ respectively. A detail of this body 10 in shown in photographic image (c), in which the surface relief structures 30 including portions W1 and W2 of different optical reflectivity are highlighted. Specifically, the regions W1 were given a white colour whereas the regions W2 were given a black colour together such that in the photographic image (a) the black coloured regions are visible whilst in the photographic image (b) the white coloured regions are visible, thereby demonstrating proof of concept of the body 10 according to embodiments of the present invention.

Figure 3:
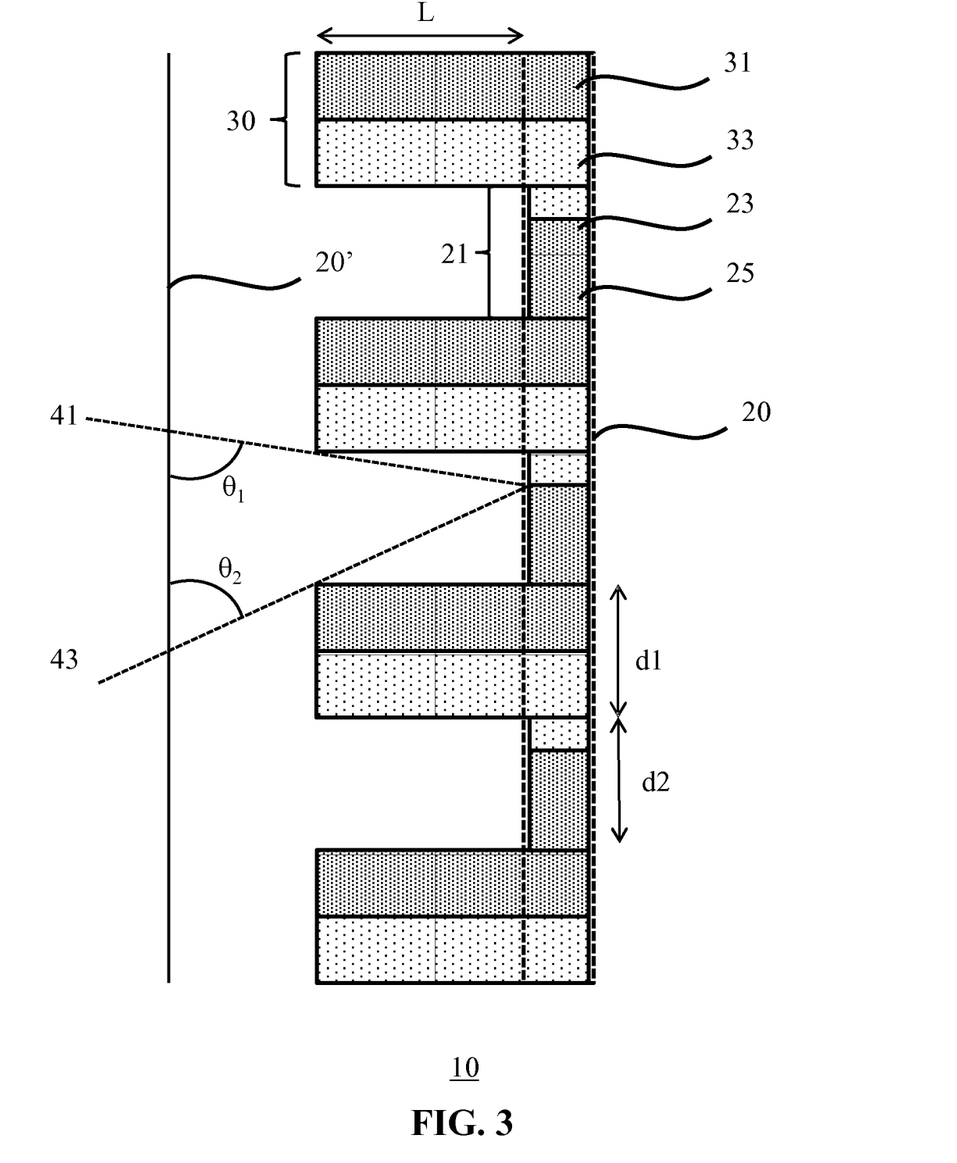
FIG. 3 schematically depicts a cross-sectional view of a body for obscuring a light source arrangement according to another embodiment.

In FIG. 1, the maximum viewing angles $\theta_1$ and $\theta_2$ at which no blending of the different optical reflectivity of the body 10 occurs are symmetrical, i.e. $\theta_1=-\theta_2$. This is the consequence of both the first region 25 and the second region 23 of the intermediate surface portion 21 having the same width, i.e. 0.5*d2. FIG. 3 schematically depicts an alternative embodiment of the body 10 in which this symmetry in viewing angles is broken by increasing the width of one of the first region 25 and the second region 23 of the intermediate surface portion 21 whilst reducing the width of the other of the and the second region 23 of the intermediate surface portion 21 by the same amount such that now $\theta_1 \neq -\theta_2$. In FIG. 3, the width of the second region 23 is increased relative to the first region 25 by way of non-limiting example only, as it is of course equally feasible to increase the width of the first region 25 relative to the second region 23 instead. This may be aesthetically interesting; for instance, when observer walks past the body 10 in a first direction, the body 10 will retain its appearance for longer or shorter than when the observer walks past the body 10 in the opposite direction, which may have an intriguing effect on the observer.

Figure 4:
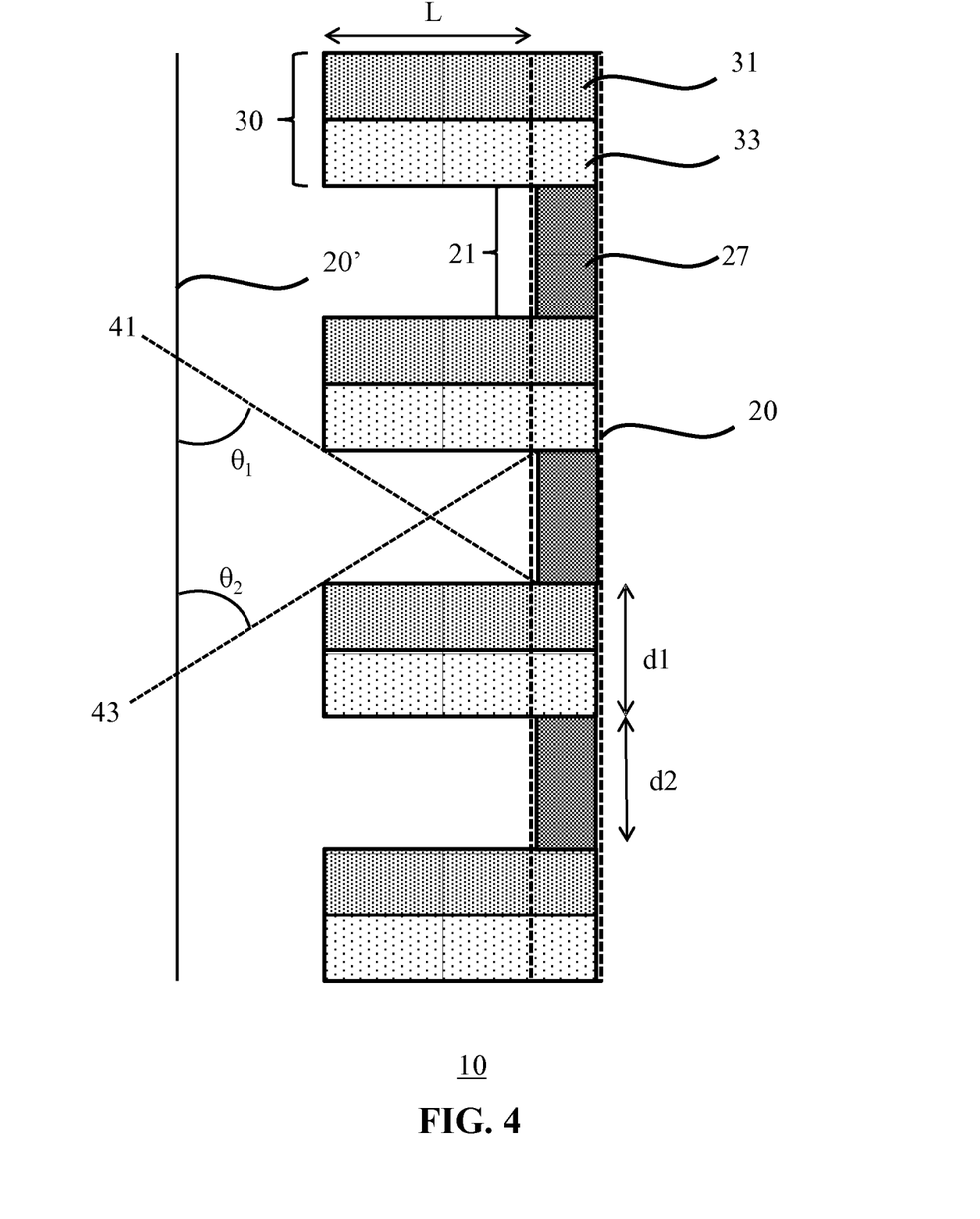
FIG. 4 schematically depicts a cross-sectional view of a body for obscuring a light source arrangement according to yet another embodiment.

In these embodiments, the intermediate surface portions 21 typically are composed of surface regions 23, 25 that have the same optical reflectivity as the neighboring portions 31, 33 of the surface relief structures 30 as previously explained such that the appearance of the body 10 is dominated by these two different optical reflectivities. However, embodiments of the invention are not limited thereto. For example, as schematically depicted in FIG. 4, the intermediate surface portions 21 may be made of a material 27 having a third optical reflectivity different to the optical reflectivity of both the first portions 31 and the second portions 33 of the surface relief structures 30, e.g. the material 27 may have a different colour to the respective colours of the first portions 31 and the second portions 33 of the surface relief structures 30 such that the body 10 will have a third appearance in an intermediate viewing angle range (i.e. in between the viewing angle ranges delimited by $\theta_1$ and $\theta_2$ respectively). Alternatively, the material 27 may be an optically transparent polymer, which may extend from the surface to the same height as the relief structures 30 in yet a further embodiment.

Of course, many other variations, such as embodiments in which both the first regions 25 and the second regions 23 of the intermediate surface portions 21 have different colours that are different to the respective colours of the first portions 31 and the second portions 33 of the surface relief structures 30 may be contemplated. Furthermore, the number of discrete regions in terms of optical reflectivity within such intermediate surface portions 21 is not necessarily limited to one or two but may contain any suitable number of such discrete regions.

Figure 5:
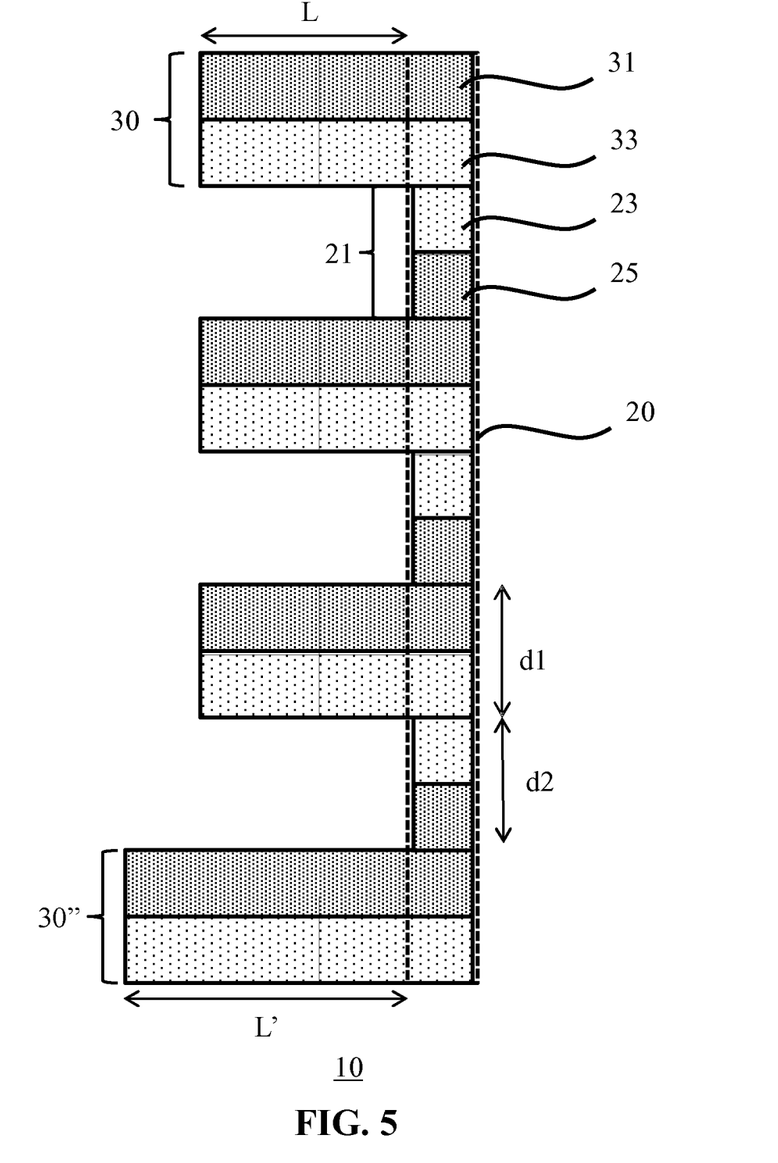
FIG. 5 schematically depicts a cross-sectional view of a body for obscuring a light source arrangement according to yet another embodiment.

In the aforementioned embodiments, the body 10 comprises a single regular periodic structure defined by the repeating units 50, such that across the surface 20 of the body 10 the same appearances are created as a function of the viewing angle of the body 10, as previously explained. However, it should be understood that other approaches may be contemplated, in which irregularities are introduced in the body 10. For example, as schematically depicted in FIG. 5, the surface relief structures 30 do not all have to have the same height L, but at least some surface relief structures 30" may have a different height L' such that across the surface 20 of the body 10 the transition between appearances may occur at slightly different viewing angles, thereby giving the body 10 a more dynamic appearance as an observer walks past the body 20, as the observer may observe that for surface regions comprising a surface relief structure 30 the transition takes place under a slightly different viewing angle compared to surface regions comprising a surface relief structure 30".

Figure 6:
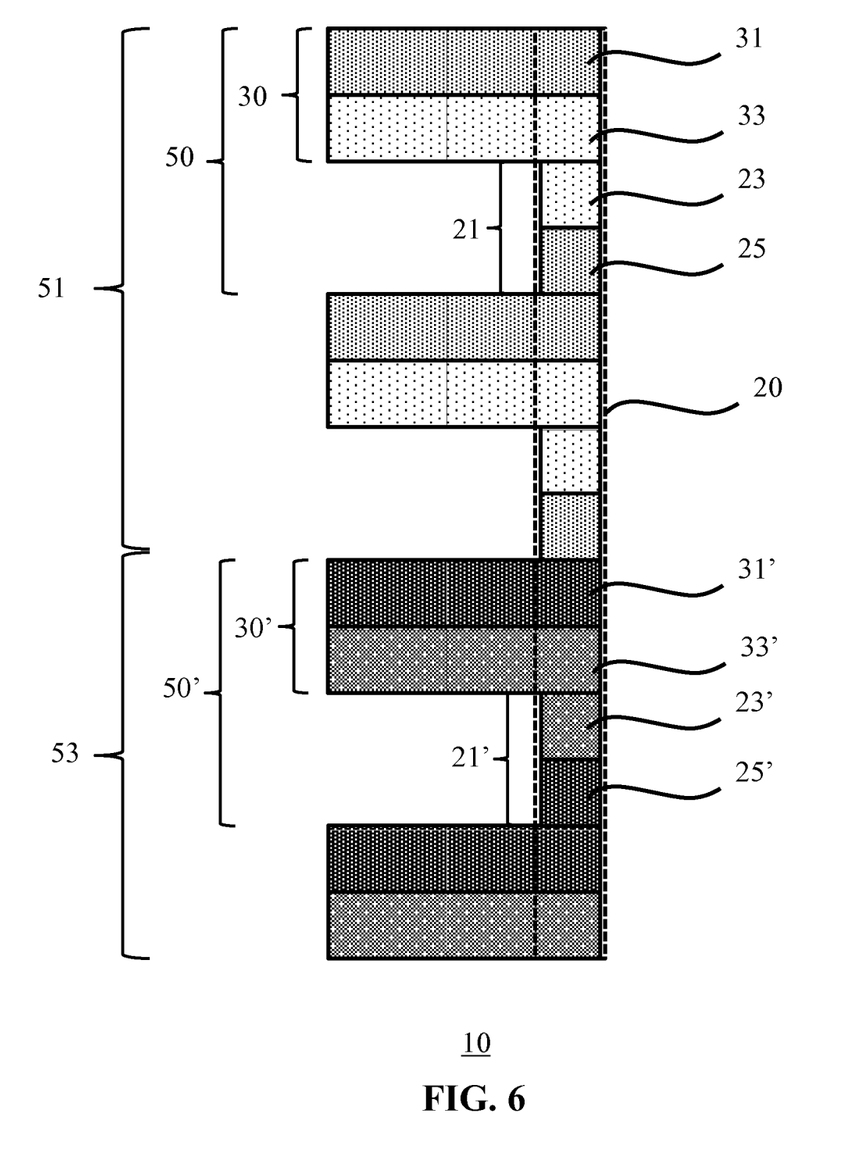
FIG. 6 schematically depicts a cross-sectional view of a body for obscuring a light source arrangement according to yet another embodiment.

Moreover, the surface 20 of the body 10 may be divided in multiple periodic structures, a sis schematically depicted in FIG. 6. In this embodiment, the surface 20 of the body 10 comprises a first periodic region 51 comprising a first plurality of repeating units 50 and a second periodic region 53 comprising a second plurality of repeating units 50'. The repeating units 50 have a different optical reflectivity to the repeating units 50', that is, the optical reflectivity of the first regions 31' and second regions 33' of the surface relief structures 30' in the second plurality of repeating units 50' are different to each other as well as are different to the respective optical transmissivities of the first regions 31 and the second regions 33 of the surface relief structures 30 in the first plurality of repeating units 50. The intermediate surface portions 21' in the second plurality of repeating units 50' may comprise a first surface region 25' having the same optical reflectivity as the first region 31' of the surface relief structures 30' and may comprise a second surface region 23' having the same optical reflectivity as the second region 33' of the surface relief structures 30' in the second plurality of repeating units 50'.

Consequently, the body 10 will have two different sets of different appearances as a function of viewing angle of the body 10, which sets are spatially distinct from each other by virtue of their intimidation by the first period region 51 and the second periodic region 53 respectively. Of course, many other variations is already explained above equally may be applied to one or more of the distinct periodic regions across the surface 20 of the body 10.

Figure 7:
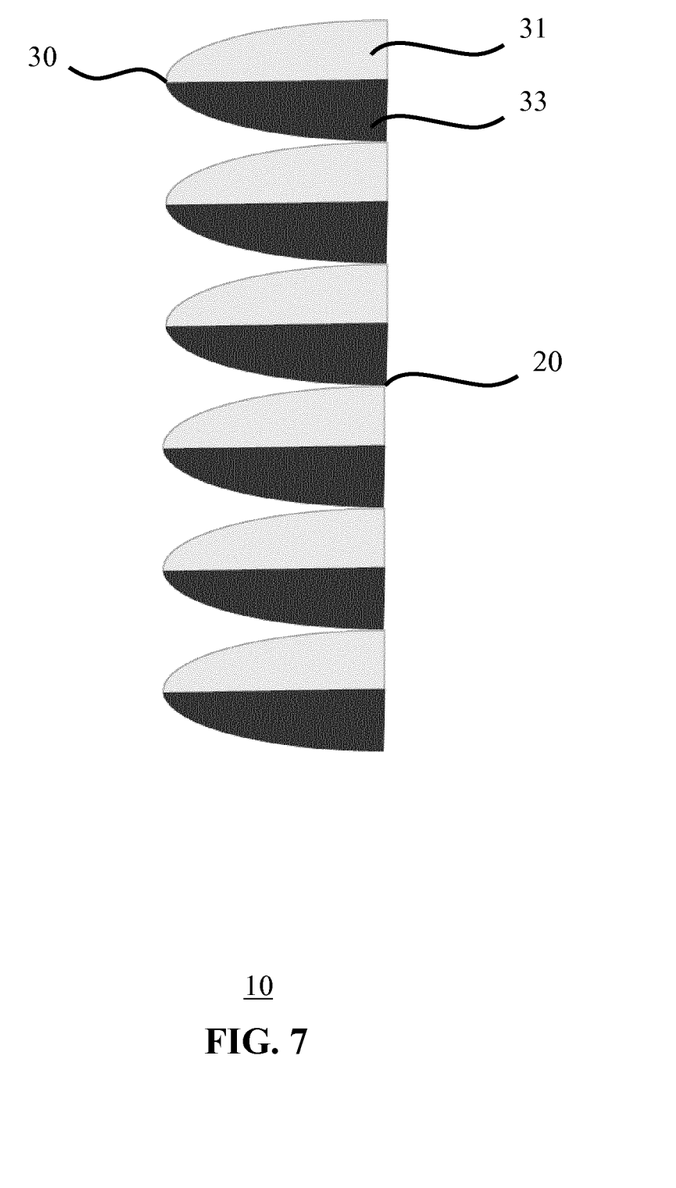
FIG. 7 schematically depicts a cross-sectional view of a body for obscuring a light source arrangement according to yet another embodiment.

In yet another set of embodiments, the intermediate surface portions 21 in between surface relief structures 30 extending from the surface 20 of the body 10 may be minimized or even omitted. This for example may be achieved using surface relief structures 30 that are wider proximal to the surface 20 than distal to the surface 20, e.g. tapering surface relief structures 30. An example embodiment is schematically depicted in FIG. 7, in which the surface relief structures 30 formed by the first portions 31 and the second portions 33 have a curved cross-section. Such tapered or curved relief structures 30 have the advantage over the previously described rectangular relief structures 30 in that the colour blending associated with such rectangular relief structures 30 is reduced. This can be understood as follows. When looking directly at a body 10 carrying a plurality of rectangular relief structures 30 even under ideal viewing angles in which only one of the side surfaces of each relief structure can be observed as previously explained with the aid of FIG. 1, the observer will still see the end surfaces of the portions 31 and 33 of the rectangular relief structures 30 that are distal to the surface 20. As these end surfaces have different colours, a degree of colour mixing cannot be avoided. On the other hand, by reducing the width of the neighboring distal portions 31, 33 of the relief structures 30 by deploying tapered or curved relief structures 30, such colour mixing is reduced or even avoided, e.g. in case of triangular relief structures 30.

Figure 8:
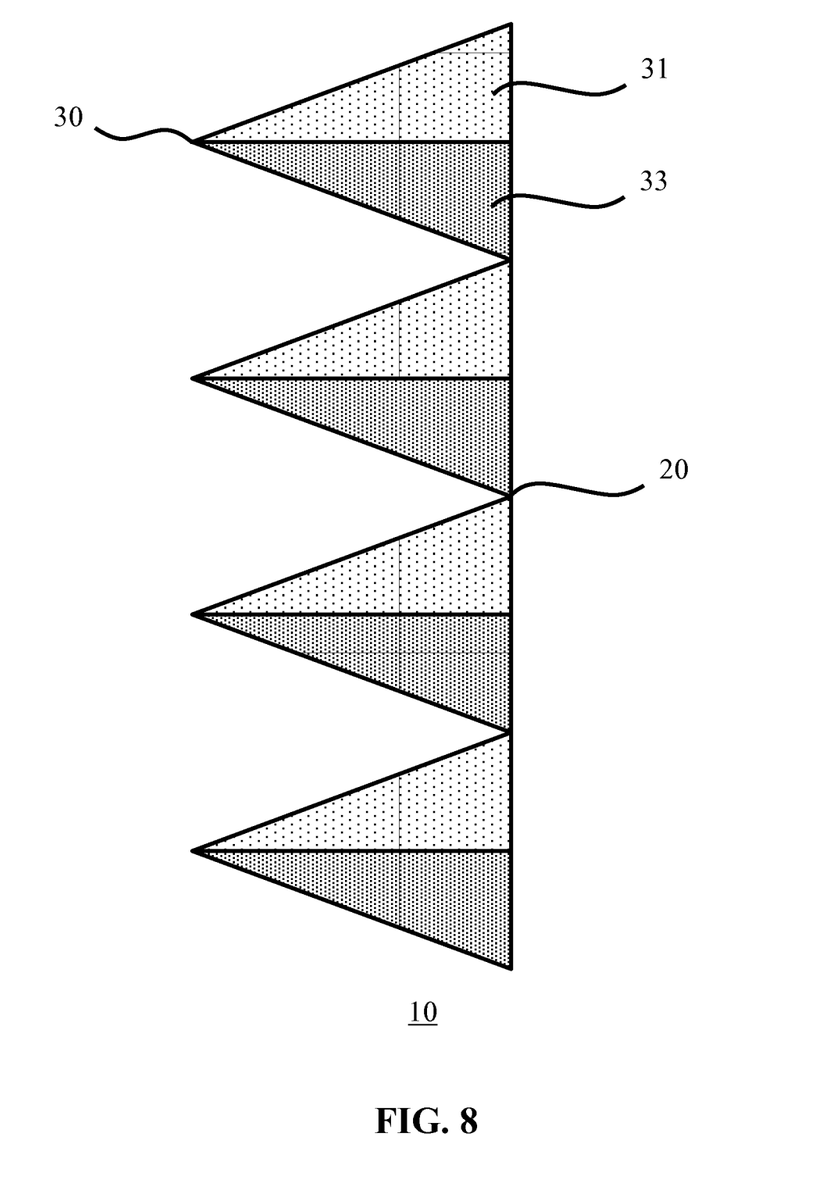
FIG. 8 schematically depicts a cross-sectional view of a body for obscuring a light source arrangement according to yet another embodiment.

An example embodiment is schematically depicted in FIG. 8, in which the surface relief structures 30 formed by the first portions 31 and the second portions 33 have a triangular cross-section. Other suitable tapering shapes of the surface relief structures 30 of course may be contemplated instead. Moreover, different relief structures 30 emanating from the surface 20 may have different shapes, e.g. a mixture of different tapered shapes, a mixture of tapered and rectangular shapes, and so on. In addition, the relief structures 30 may cover the entire surface 20 of the body 10 or may cover only part of the surface 20 of the body 10.

Figure 9:
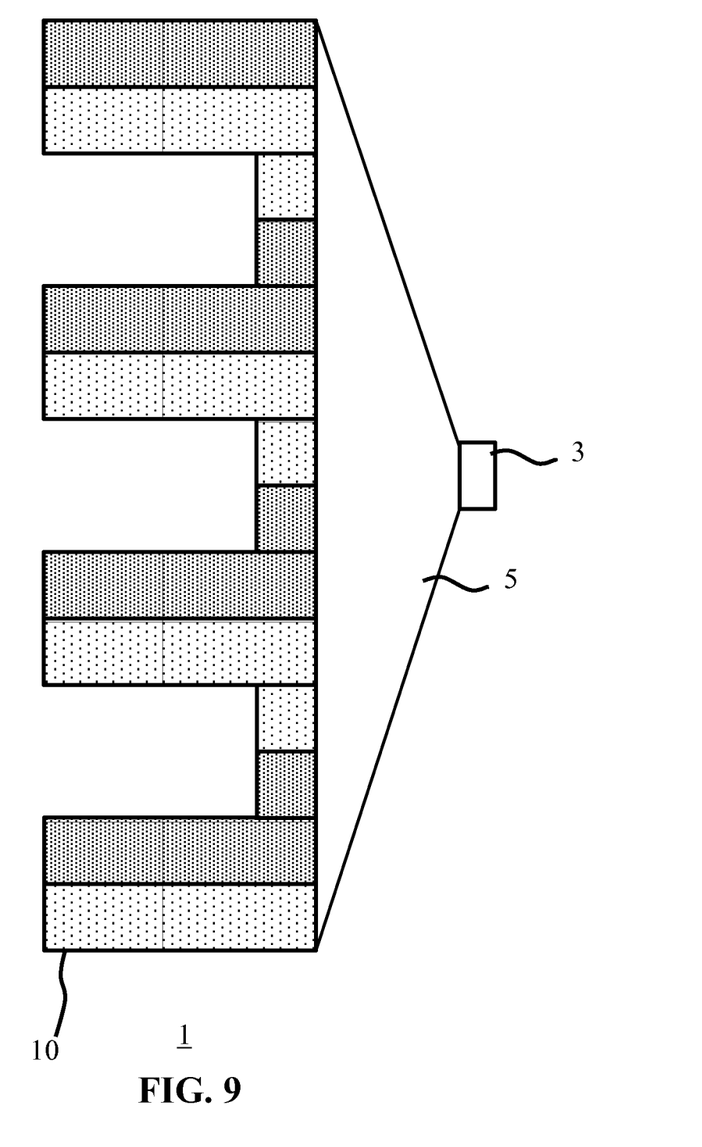
FIG. 9 schematically depicts a cross-sectional view of a luminaire including a body for obscuring a light source arrangement according to an embodiment.

The body 10 may be provided as a standalone object or alternatively may form a part, e.g. an integral part, of a luminaire 1 as schematically depicted in FIG. 9. Such a luminaire 1 typically comprises a light source arrangement 3 in addition to the body 10 carrying the aforementioned relief structure. The light source arrangement 3 may be placed within the luminaire 1. Other suitable arrangements and shapes will be apparent to the skilled person.

The body 10 may be manufactured using any suitable manufacturing technique. However, in a preferred embodiment the body 10 is manufactured using 3-D printing such as fused deposition modelling printing. FDM printers such as the printer 70 schematically depicted in FIG. 10 use one or more thermoplastic filaments 61, 63, which are fed into a heated extruder nozzle 74 by drive wheels 72, where heated to its melting point and then extruded in layers 65 onto a heated platform 66 to create a three dimensional object, i.e. the body 10. A layer 65 from which the body 10 is formed is deposited onto the heated print platform 66 while in a high viscosity liquid state, which then cools and becomes solid upon cooling.

In this manner, a 3D structure may be built up as a sequence of layer patterns, e.g. the layers 65 to form the body 10. In a preferred embodiment, the designs of the body 10 preferably are made such that a so-called spiralized printing strategy in which the printer head including the extruder nozzle 74 can move continuously in the X-Y plane continuously without the need for a jump can be deployed. In yet another embodiment, the printer head is capable of printing a plurality of filament layers 61, 63 at the same time, e.g. the extruder nozzle 74 comprises a plurality of filament feeders, such that multiple layers 65 of the optically reflective housing 10 can be printed simultaneously. During printing, the support 66 on which body 10 is formed may be rotated in the X-Y plane about the Z axis in order to form the body during the 3-D printing of a layer 65 of the body 10 to form the 3-D shape of the body 10. In the example embodiment schematically depicted in FIG. 10, three extrusion nozzles 74 were arranged adjacent to each other and the 3-D printing was performed on a rotating platform 66 that could be moved in the Z-direction, whilst the nozzles could be moved in the XY plane. By way of non-limiting example, the extrusion nozzles 74 for the filaments 63 had a diameter of 1 mm whilst the extrusion nozzles 74 for the filament 61 had a diameter of 0.8 mm. As will be readily understood by the skilled person, the thickness of the deposited layers is predominantly governed by the extrusion speed of the extruder head and the extrusion rate of the polymer material such that layers thinner than the nozzle diameter may be achieved.

Figure 10:
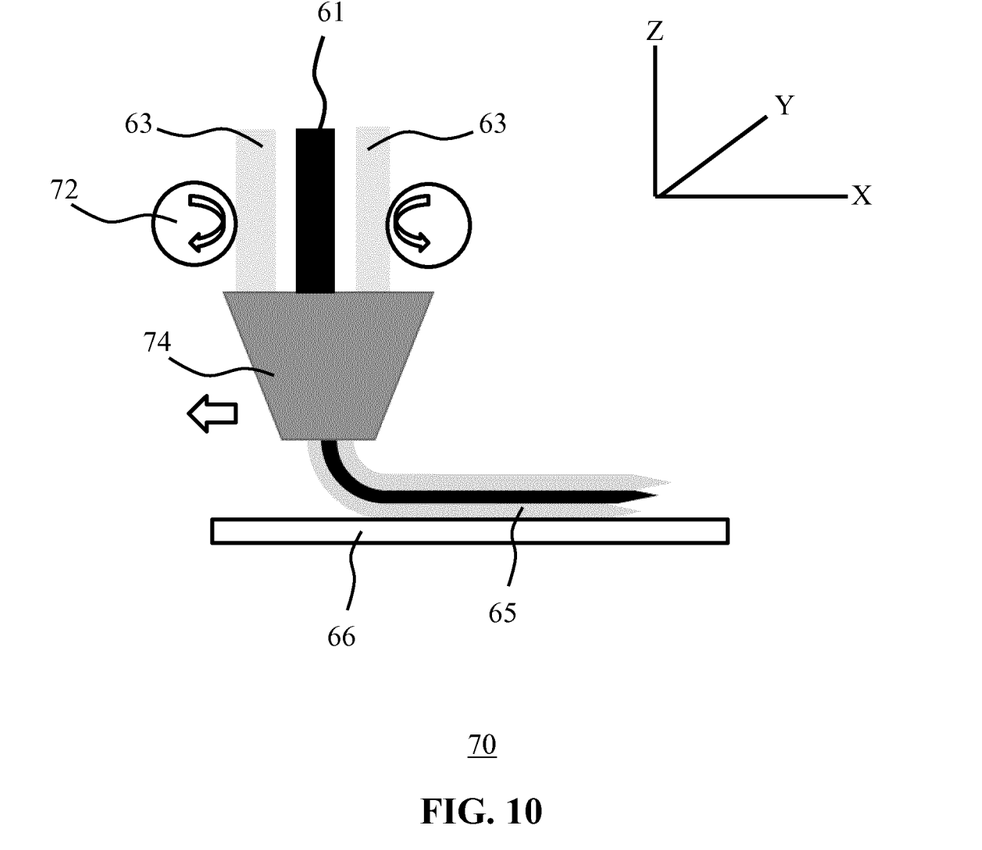
FIG. 10 schematically depicts an example embodiment of a manufacturing method of a body for obscuring a light source arrangement according to an embodiments of the present invention.

FDM printers are relatively fast, low cost and can be used for printing complicated 3D objects. Such a 3-D printing setup is well-known per se and is therefore not explained in further detail for the sake of brevity only. Such printers may be used for printing various shapes using various polymers, as also is well-known per se. To perform a 3D printing process, the printer may be controlled using a print command file generated by computer aided design (CAD) software specifying the 3-D shape of the body 10, and this controls how the filament is processed. Any suitable material may be used for forming the respective layers of the body 10. For example, these may be materials suitable for use in a 3-D printing process, e.g. polymers that may be extruded in an FDM printing process.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature Tg and/or a melting temperature Tm. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature (Tg) and/or a melting point (Tm), and the printer head action comprises heating the 3D printable material above the glass transition and if it is a semi-crystalline polymer above the melting temperature. In yet another embodiment, the 3D printable material comprises a (thermoplastic) polymer having a melting point (Tm), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former.

As indicated above, the invention thus provides a method comprising providing at least one filament of 3D printable material and printing during a printing stage said 3D printable material on a substrate, to provide said 3D item (i.e. body 10). Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), polycarbonate (PC), terephthalate (such as PET polyethylene terephthalate), styrene acrylonitryl (SAN), Acrylic (polymethylacrylate, polymethylmethacrylate (PMMA), Polyacrylonitrile), copolymers of (metha)acrylates Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), thermoplastic elastomer, etc. Optionally, the 3D printable material comprises a 3D printable material selected from the group consisting of a polysulfone. Where different layers of the 3-D item have different colours, this may be achieved by the inclusion of a suitable pigment or dye within the 3-D printable material, as will be immediately apparent to a person skilled in the art of 3-D printing. Highly transmissive polymers can be selected from Polycarbonate (PC), Polyacrylics such as Polymethylmethacrylate (PMMA), aromatic polyesters such as polyethyleneteleptthalate (PET), non-aromatic polyesters and copolymers thereof. Polystyrene, Styrene acrylonitryl, styrene methacrylate (SMA). The printable material may be printed on a receiver item. Especially, the receiver item may be the print platform 66 or may be comprised by the print platform 66. The receiver item can also be heated during 3D printing. However, the receiver item may also be cooled during 3D printing.

Polymers can be intrinsically reflective such as semi crystalline polymers. Incompatible polymer blends can also be reflective. However, the reflectivity of a polymer is usually increased using additives such as titanium oxide, aluminum oxide, s easiest way to make the polymers reflective. Inorganic and organic colorants can then be used to colour the polymers.

Black absorbing materials such as carbon black may be added to the polymers to tune its reflective properties, e.g. to tune a perceived grey scale of the optically reflective layer formed from such a polymer.

It is also possible to give polymers a metallic reflective appearance by adding metal particles to the polymer such as aluminium and copper particles. In example embodiments, the particles comprise one or more of glass and mica. The particles are reflective for at least part of the visible light, i.e. light having one or more wavelengths selected from the range of 380-780 nm. The particles may have a coating, wherein the coating comprises one or more of a metal coating and a metal oxide coating.

The flakes, as mentioned herein, may have any shape. An example of particles with a high aspect ratio are cornflake particles. Cornflake particles are high aspect ratio flakes with ragged edges and a cornflake-like appearance. Cornflake particles may have aspect ratios in the range of 10-1.000. In specific embodiments, the particles may have the shape of a flake, such as a "silver dollar" shape.

In specific embodiments, the particles may be irregularly shaped.

In specific embodiments, the particles may comprise pieces of broken glass (having the herein defined dimensions). As previously mentioned, the particles can be mica particles or glass particles, especially mica particles or glass particles with a coating. In specific embodiments, the particles comprise glass particles having a coating. Such particles may have better properties, such as in terms of reflection, especially specular reflection, than metal flakes. Also, such particles may tend to provide a relative higher diffuse reflection.

In specific embodiments the glass or mica particles, especially the glass particles, may have a coating comprising one or more of a metal coating and a metal oxide coating.

Metal coatings may e.g. be selected from aluminum, silver, gold, etcetera. Metal oxide coatings may e.g. include tin oxide, titanium oxide, etcetera. Therefore, in specific embodiments the particles comprise glass flakes. In further specific embodiments, the particles comprise silver or aluminum coated glass particles. In specific embodiments, combinations of different type of particles may be used. Especially, the particles may comprise one or more of a silver coating and an aluminum coating.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A body comprising a surface,
wherein the surface comprises a first optically reflective relief structure and a second optically reflective relief structure, each of the first and second optically reflective relief structures comprising a first portion and an adjacent second portion extending from said surface, the first portion having a different optical reflectivity to the second portion,
wherein the first and second optically reflective relief structures are separated by an optically transparent medium contacting the first and second optically reflective relief structures,
wherein the first portion of the first optically reflective relief structure faces the second portion of the second optically reflective relief structure,
wherein the surface further comprises an optically reflective intermediate surface portion in between the first and second optically reflective relief structures, and
wherein the intermediate surface portion comprises a first region and an adjacent second region, the first region of the intermediate surface portion being proximal to and having the same optical reflectivity as the first portion of the first optically reflective relief structure, and the second region of the intermediate surface portion being proximal to and having the same optical reflectivity as the second portion of the second optically reflective relief structure.

2. The body of claim 1, wherein the optically transparent medium is an optically transparent polymer material or air.

3. The body of claim 1, wherein the first portion and the second portion have different colours.

4. The body of claim 1, wherein the first optically reflective relief structure has a different heights than the second optically reflective relief structures.

5. The body of claim 1, wherein each optically reflective relief structure has a height to width ratio of at most 10.

6. The body of claim 1, wherein the first region and the second region have different widths.

7. The body of claim 1, wherein said intermediate surface portion has a colour different to the first and second portions of said first and second optically reflective relief structures.

8. The body of claim 1, wherein the body comprises a plurality of repeating units, each defined by an optically reflective relief structure and an adjacent intermediate surface portion.

9. The body of claim 8, wherein said repeating unit has a width in a range of 0.1-10 mm.

10. The body of claim 8, wherein the surface comprises a first periodic region comprising a first plurality of said repeating units and a second periodic region comprising a second plurality of said repeating units, wherein the repeating units in said first plurality have a different optical reflectivity to the repeating units in said second plurality.

11. The body of claim 1, wherein the surface is a closed surface enveloping a space for housing a light source arrangement.

12. A luminaire comprising the body of claim 1 and a light source arrangement positioned relative to the body.

13. A method of manufacturing the body according to claim 1, the method comprising simultaneously printing each optically reflective relief structure and each optically reflective intermediate surface portion using 3-D printing.

* * * * *